J. T. MUNNICH.
TESTING-MACHINE.
No. 171,838. Patented Jan. 4, 1876.
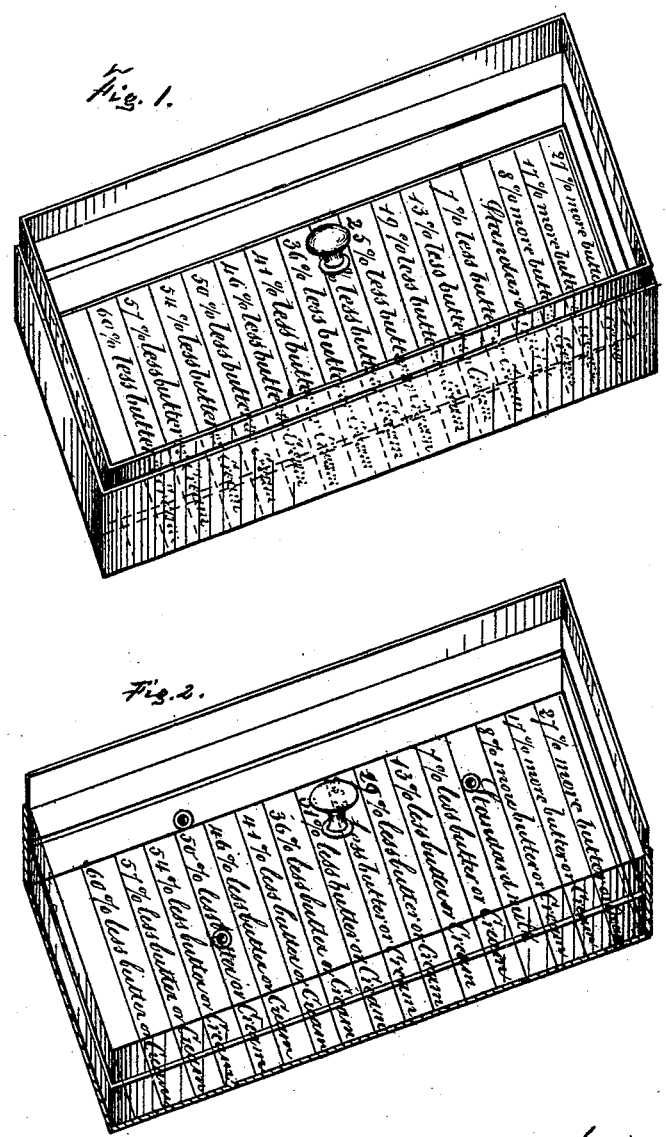

UNITED STATES PATENT OFFICE.

JOHAN T. MUNNICH, OF HAARLEM, HOLLAND, ASSIGNOR OF ONE-HALF HIS RIGHT TO WILLIAM TINKER, OF SAME PLACE.

IMPROVEMENT IN TESTING-MACHINES.

Specification forming part of Letters Patent No. 171,838, dated January 4, 1876; application filed November 15, 1875.

*To all whom it may concern:*

Be it known that I, Dr. JOHAN THEODOR MUNNICH, of Haarlem, Holland, a subject of the King of the Netherlands, have invented or discovered a new and useful improved apparatus for testing the quality of milk, extracts, pigments, powders, and other matters; and I, the said Dr. JOHAN THEODOR MUNNICH, do hereby declare the nature of the said invention, and in what manner the same is to be performed, to be particularly described and ascertained in and by the following statement thereof—that is to say:

This invention consists of an instrument constructed in the following manner, viz: Of two perfectly plane pieces of good glass, the dimensions of which, by preference, are about a quarter of an inch thick, two inches wide, and twelve inches long, fitted into a box or receptacle. One of the above glasses is to be engraved or have a printed or written paper, with letters, lines, or figures marked thereon, or pasted on its under side, the two pieces of glass being cemented in a box of similar size, but about three-quarters of an inch deep. The letters, lines, or figures must be distinctly visible through the glass. The box is to be placed upon a table or other level or nearly level support.

In order to test a sample of any substance—say, milk—the test-sample is to be diluted with, say, three parts of pure water, which is to be shaken well together. A small portion of this diluted milk, if milk is to be tested, is to be poured upon the under glass in the box. The upper glass, which has been adjusted to a certain angle, is then to be placed carefully on the under glass in the box. The space between the two glasses, which is now filled with the diluted milk or other test-sample, will have acquired the form of a wedge, and, by looking through the glasses at the end, where they are in contact, the characters may be distinctly read under the bottom or lower glass, and to a certain extent at the other end of the instrument.

Now, according to the quality of the test-sample of milk, so will the characters written or engraved be visible or invisible until the last figure that can be distinctly read is reached by the eye, which will give very nearly the percentage of pure milk contained in the sample, the purity of which is determined by the quantity of butter it contains, the percentage of which may be very accurately determined by this instrument, the graduated scale of lines or figures being first accurately arranged.

In like manner tests of the qualities of coloring matters, pigments, extracts, powders, and other like materials may be made by diluting them with water, and placing them on the under glass of this instrument, a graduated printed scale being made conformable to the substance to be tested.

A modification of the above instrument may be made, which is called the "Pocket Milk-Tester," easily carried in the pocket, and is sufficiently operative to detect the adulteration of milk, if not to give the exact percentage of value.

This instrument is also made with two plane glasses in a box, with an inscription under the bottom glass, but the glasses are adjusted parallel to each other at a proper distance apart, so that when good milk (diluted) is put into this instrument the inscription will be plainly legible, but when the milk has been adulterated the characters will be plainly legible.

Having now described the nature of my said invention, and how the same is to be performed and carried out, I wish it to be understood that what I claim, and desire to secure, is—

1. The method or manner of testing the purity of milk or the amount of coloring matter in fluids by pouring a small quantity of such, previously diluted as described, between two transparent plates having plane surfaces, the lower one of which is graduated to a suitable scale, to be read in the manner substantially as set forth.

2. A fluid-tester consisting, essentially, of two plates of transparent material, such as glass, the lower one of which is cemented or otherwise made stationary in a suitable casing, and provided with a graduated scale, while the upper one is so arranged as to form a wedge-opening or space between the two when both plates are in position, substantially as and for the purposes set forth.

J. T. MUNNICH.

Witnesses:
 HENRI VAN BOOVE,
 FRED. WILLARS.